(12) United States Patent
Azevedo et al.

(10) Patent No.: US 7,231,501 B2
(45) Date of Patent: Jun. 12, 2007

(54) METHOD FOR AVOIDING ALIASED TOKENS DURING ABNORMAL COMMUNICATIONS

(75) Inventors: Michael J. Azevedo, San Jose, CA (US); Carol Spanel, San Jose, CA (US); Andrew D. Walls, San Jose, CA (US)

(73) Assignee: IBM Corporation, Armonk, NY (US)

( * ) Notice: Subject to any disclaimer, the term of this patent is extended or adjusted under 35 U.S.C. 154(b) by 335 days.

(21) Appl. No.: 10/813,519

(22) Filed: Mar. 30, 2004

(65) Prior Publication Data

US 2005/0240833 A1    Oct. 27, 2005

(51) Int. Cl.
*G06F 13/00* (2006.01)
*G06F 11/00* (2006.01)
(52) U.S. Cl. ............... 711/156; 711/154; 709/223; 709/226; 714/47; 714/49; 710/5
(58) Field of Classification Search ............... None
See application file for complete search history.

(56) References Cited

U.S. PATENT DOCUMENTS

| | | | |
|---|---|---|---|
| 5,113,514 A | 5/1992 | Albonesi et al. | |
| 5,249,231 A | 9/1993 | Covey et al. | |
| 5,802,575 A | 9/1998 | Greenley et al. | |
| 5,832,241 A | 11/1998 | Guy et al. | |
| 6,301,627 B1 | 10/2001 | Neal | |
| 6,490,636 B1 | 12/2002 | Kikuchi et al. | |
| 6,871,237 B2* | 3/2005 | Han et al. ................. | 710/5 |
| 2002/0065980 A1 | 5/2002 | Lasserre et al. | |
| 2002/0120816 A1 | 8/2002 | Amano | |
| 2002/0178283 A1 | 11/2002 | Robinson | |
| 2003/0061472 A1 | 3/2003 | Kruckemyer | |
| 2004/0264284 A1* | 12/2004 | Priborsky et al. ........ | 365/232 |

* cited by examiner

*Primary Examiner*—Mano Padmanabhan
*Assistant Examiner*—Jasmine Song
(74) *Attorney, Agent, or Firm*—Cardinal Law Group

(57) ABSTRACT

A data initiator device designates an initial data tag set for tagging data transfers to thereby attach data tags from the designated set to commands directed to data transfers between the data initiator device and a data target device subsequent to the designation of the initial data tag set. The data transfer commands are issued with the attached data tags from the designated data tag set until an occurrence of a reset error associated with one of the issued data transfer commands. In response to the reset error, the data initiator device designates a different data tag set for tagging data transfers to thereby attach data tags from the newly designated data tag set to commands directed to data transfers between the data initiator device and the data target device subsequent to the designation of the new data set.

20 Claims, 5 Drawing Sheets

METHOD FOR AVOIDING ALIASED TOKENS DURING ABNORMAL COMMUNICATIONS

FIELD OF INVENTION

The present invention generally relates to data transfer protocols for transferring data between devices. The present invention specifically relates to a tag set allocation and designation method implemented in data transfer protocols for avoiding aliased tokens during abnormal communications between the devices.

BACKGROUND OF THE INVENTION

FIG. 1 illustrates an interfacing between a workstation 10 operating as a data initiator device and a server 20 operating as a data target device whereby workstation 10 issues read commands directed to transfers of data units responsive to the read commands from server 20 to workstation 10. To this end, workstation 10 has traditionally issued the read commands under a data transfer protocol ("DTP") 11 having a fixed designation of data tags 12 for tagging the data transfers whereby each data unit can be identified as corresponding to a particular read command. Specifically, a data tag is attached to both a read command by workstation 10 and a responsive data unit by server 20 to thereby facilitate an identification of a correspondence of the responsive data unit to that particular read command.

Data tags 12 historically have been incremented in a looped manner (e.g., 1, 2, 3, 4, 1, 2, 3, 4, 1, 2, ... ) with an intention of maintaining a sequential command ordering of data by workstation 10. This sequential command ordering involves a receipt by workstation 10 of a data unit responsive to the most current read command issued by workstation 10 prior to an issuance of a new read command by workstation 10. In an absence of any errors in the transfer of data units from server 20 to workstation 10, the looped incrementing of data tags 12 has proven to be efficient in facilitating an identification of a correspondence of each data unit to a particular read command even when the sequential command ordering of data is not maintained by workstation 10. However, in the presence of an error in the transfer of a data unit from server 20 to workstation 10, the looped incrementing of data tags 12 has proven to be ineffective in facilitating an identification of a correspondence of each data unit to a particular read command irrespective of whether the sequential ordering of data is or is not maintained by workstation 10.

For example, as illustrated in FIG. 1, sequential data transfers from server 20 to workstation 10 of data units 1–3 responsive to read commands 1-3, respectively, tagged with data tags 1–3, respectively, were executed without an error. A data transfer however from server 20 to workstation 10 of a data unit 4 responsive to a read command 4 tagged with a data tag 4 did not occur in a timely manner as represented by the dashed arrow, which results in an issuance of a reset error from workstation 10 to server 20 whereby workstation 10 and server 20 are reset to an equivalent state that excludes outstanding read command 4. Assuming the reset of workstation 10 and server 20 to the equivalent state was successful whereby outstanding read command 4 has been eradicated, sequential data transfers from server 20 to workstation 10 of data units 5–8 responsive to read commands 5–8, respectively, tagged with data tags 1–4, respectively, can be executed without a data error. However, if the reset of workstation 10 and server 20 to the equivalent state was unsuccessful whereby server 20 maintains a processing of outstanding read command 4 after an issuance of read command 8 having the same data tag 4, then a data error will occur if server 20 transfers data unit 4, which is unresponsive to read command 8, to workstation 10 as represented by the dashed arrow prior to a transfer of data unit 8, which is responsive to read command 8, to workstation 10. The data error in this case involves an incorrect correspondence of data unit 4 to read command 8 by workstation 10.

The computer industry is therefore continually striving to improve upon data tag methods with the goal of avoiding the occurrence of aliased tokens associated with data errors resulting from an incorrect correspondence of a data unit to an issued data transfer command (e.g., a read command or a write command).

SUMMARY OF THE INVENTION

The present invention provides a new and unique data tag allocation and designation method for minimizing, if not eliminating, the occurrence of aliased tokens associated with data errors resulting from an incorrect correspondence of a data unit to an issued data transfer command (e.g., a read command or a write command).

One form of the present invention is a method of operating a data initiator device in communicating with a data target device based on a plurality of data tag sets. The method involves (1) an initial designation of a first set of at one data tag for tagging data transfers between the data initiator device and the data target device, (2) an attachment of a first data tag from the first set of at least one data tag to a first data transfer command directed to a first data transfer between the data initiator device and the data target device subsequent to the designation of the first set of at least one data tag for tagging data transfers, (3) an issuance of the first data transfer command with the attached first data tag to the data target device, (4) a designation of the second set of at least one data tag for tagging data transfers in lieu of the first set of at least one data tag in response to a detection of a first error associated with an execution of the first data transfer command, (5) an attachment of a second data tag from a second set of at least one data tag to a second data transfer command directed to a second data transfer between the data initiator device and the data target device subsequent to the designation of the second set of at least one data tag for tagging data transfers, and (6) an issuance of the second data transfer command with the attached second data tag to the data target device.

A second form of the present invention is a signal bearing medium tangibly embodying a program of machine-readable instructions executable by a processor for operating a data initiator device in communicating with a data target device based on a plurality of data tag sets. The execution of the instructions involves (1) an initial designation of a first set of at one data tag for tagging data transfers between the data initiator device and the data target device, (2) an attachment of a first data tag from the first set of at least one data tag to a first data transfer command directed to a first data transfer between the data initiator device and the data target device subsequent to the designation of the first set of at least one data tag for tagging data transfers, (3) an issuance of the first data transfer command with the attached first data tag to the data target device, (4) a designation of the second set of at least one data tag for tagging data transfers in lieu of the first set of at least one data tag in response to a detection of a first error associated with an execution of the first data transfer command, (5) an attachment of a second data tag from a second set of at least one data tag to a second data transfer command directed to a second data transfer between the data initiator device and the data target device subsequent to the designation of the second set of at least one data tag for tagging data transfers, and (6) an issuance of the second data transfer command with the attached second data tag to the data target device.

A third form of the present invention is device employing a processor, and a memory storing instructions operable with the processor for operating a data initiator device in communicating with a data target device based on a plurality of data tag sets. The execution of the instructions by the processor involves (1) an initial designation of a first set of at one data tag for tagging data transfers between the data initiator device and the data target device, (2) an attachment of a first data tag from the first set of at least one data tag to a first data transfer command directed to a first data transfer between the data initiator device and the data target device subsequent to the designation of the first set of at least one data tag for tagging data transfers, (3) an issuance of the first data transfer command with the attached first data tag to the data target device, (4) a designation of the second set of at least one data tag for tagging data transfers in lieu of the first set of at least one data tag in response to a detection of a first error associated with an execution of the first data transfer command, (5) an attachment of a second data tag from a second set of at least one data tag to a second data transfer command directed to a second data transfer between the data initiator device and the data target device subsequent to the designation of the second set of at least one data tag for tagging data transfers, and (6) an issuance of the second data transfer command with the attached second data tag to the data target device.

The terms "data initiator device" and "data target device" are defined herein to encompass any type of data processing device, such as, for example, a personal computer, a workstation, a server, a firewall, a router, a printer, a fax machine, a personal data assistant, a telephone, a mobile phone, and the like. Those having ordinary skill in the art will appreciate a particular device can serve either as a data initiator device or a data target device in dependence upon the context of the data transfer involving the device. For example, a server serves as a data target device for responding to a command from a network device, yet serves as a data initiator device when issuing a command to a network device.

The term "data transfer command" as used herein without a qualifier (e.g., read and write) is intended to encompass a read command, a write command and any other commands for initiating a transfer of data between devices.

The forgoing forms and other forms, objects, and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DESCRIPTION OF THE PREFERRED EMBODIMENT

Data tag designation of the present invention encompasses an equal or unequal distribution of data tags among two or more data tag sets, where each data tag set contains one or more data tags, and an allocation of the two or more data tag sets to a data transfer protocol. Data tag designation of the present invention further encompasses an operation of a data initiator device in tactical designating one data tag set at a time for tagging data transfers between the data initiator device and a data target device to thereby minimize, if not eliminate, any occurrences of an incorrect correspondence of a data unit to an issued data transfer command (e.g., a read command and a write command).

Figure 1:
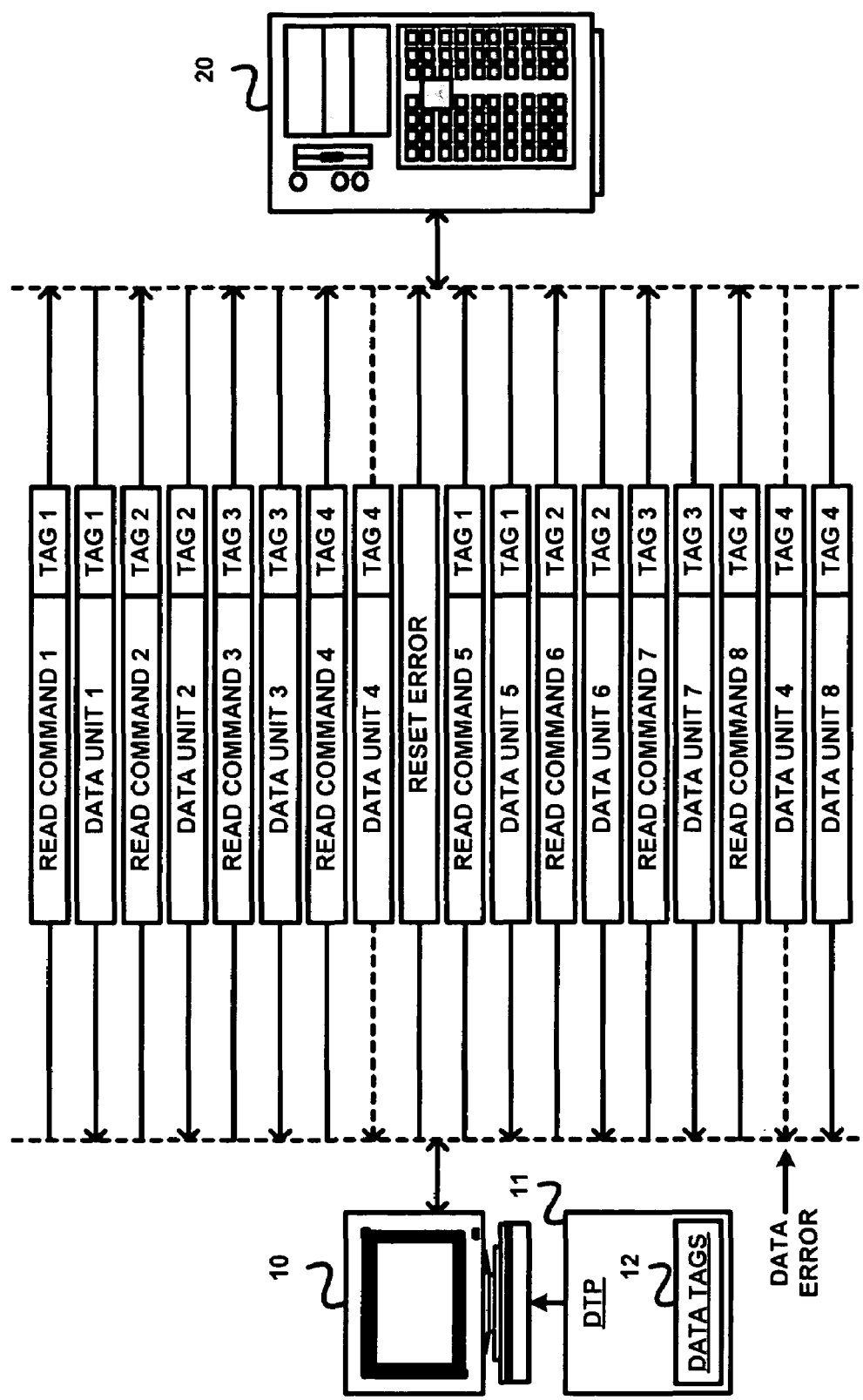
FIG. 1 illustrates exemplary data transfers between a data initiator device and a data target device as known in the art.
Figure 2:
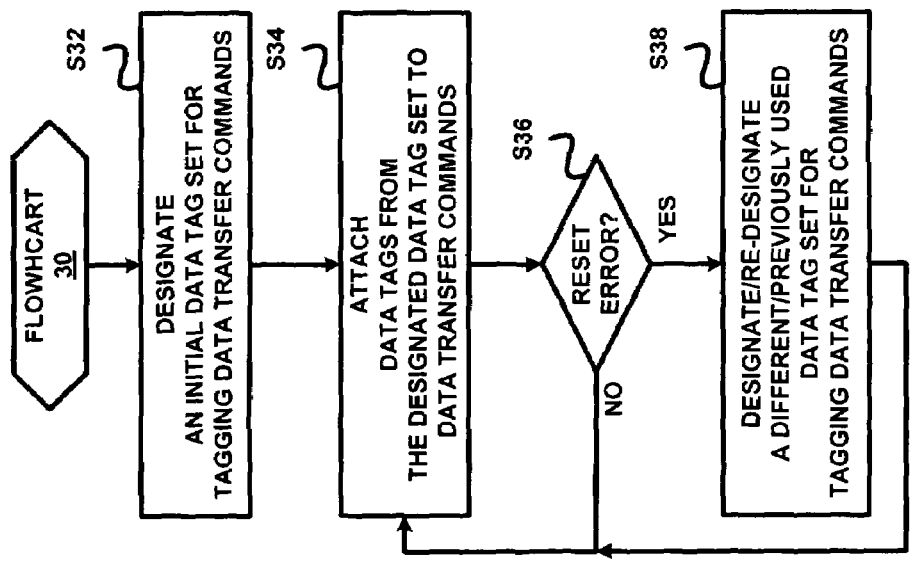
FIG. 2 illustrates a flowchart representative of a data tag allocation designation method in accordance with one embodiment of the present invention.

FIG. 2 illustrates a flowchart 30 representative of a data tag designation method of the present invention. Flowchart 30 is executed by a data initiator device (e.g., workstation 10 illustrated in FIG. 1) having data tags partitioned into two of more data tag sets allocated to a data transfer protocol whereby the data initiator device tactically designates one data tag set at a time for tagging data transfers. In practice, the number of data tag sets, the number of data tags within each set, and a particular data transfer protocol employed by the data initiator device is dependent upon a commercial implementation of the present invention and is therefore without limit. In one exemplary embodiment, four (4) sets of eight (8) data tags each are allocated to a data transfer protocol directed to issuing commands in a two-step process involving an issuance of a target address followed by an issuance of attributes including an attached data tag.

The data initiator device commences an execution of flowchart 30 by designating an initial data tag set to the data transfer protocol during a stage S32 of flowchart 30. The data initiator device thereafter proceeds to stages S34 and S36 of flowchart 30 for a first time to attach a data tag from the initial designated data tag set to each data transfer command being issued by the data initiator device until an occurrence of a reset error associated with one of the issued data transfer commands. In practice, the technique by which the data tags are attached to the data transfer commands and the technique by which reset errors are determined are dependent upon a commercial implementation of the present invention and are therefore without limit.

In one exemplary embodiment, the data tags are attached to the data transfer commands being issued by the data initiator device in an incremental looping manner, and a reset error is indicative of a failure by the data initiator device to receive a data unit responsive to a particular issued data transfer command from a data target device in a timely manner.

Upon a first occurrence of a reset error, the data initiator device proceeds to a stage S38 of flowchart 30 for a first time to designate a different data tag set for tagging data transfers in lieu of the initially designated data tag set. In practice, the technique for designating a different data tag set for tagging data transfers is dependent upon a commercial implementation of the present invention and is therefore without limit. In one exemplary embodiment, the data tag sets are designated in an incremental looping manner.

The data initiator device thereafter returns to stages S34 and S36 for a second time to attach a data tag from the newly designated data tag set to each data transfer command being issued by the data initiator device until an occurrence of a reset error associated with one of the issued data transfer commands whereby the data initiator device returns to stage S38 to designate a different data tag set for tagging data transfers in lieu of the current allocated data tag set or to re-designate a previously used data tag set for tagging data transfers in lieu of the current allocated data tag set. In practice, the technique by which the data initiator device selects whether to designate a different data tag set or to re-designate a previously used data tag set is dependent upon the number of data tag sets, which is dependent upon a commercial implementation of the present invention, and is therefore without limit.

The data initiator device will thereafter loop through stages S34–S38 until such time the data initiator device commences a new implementation of flowchart 30.

Figure 3:
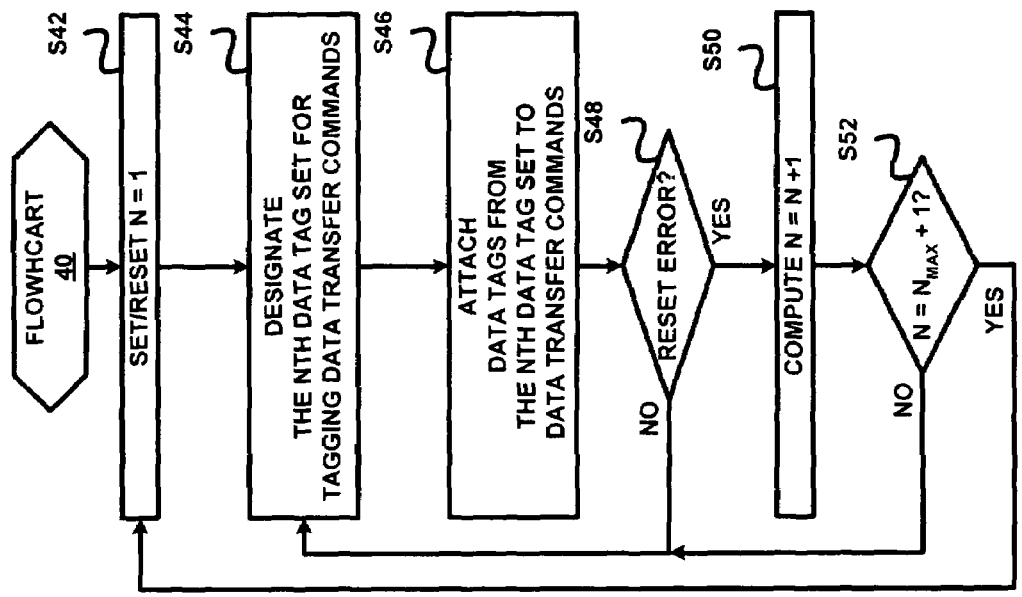
FIG. 3 illustrates a flowchart representative of one embodiment of the data tag designation method illustrated in FIG. 2 in accordance with the present invention.
Figure 4:
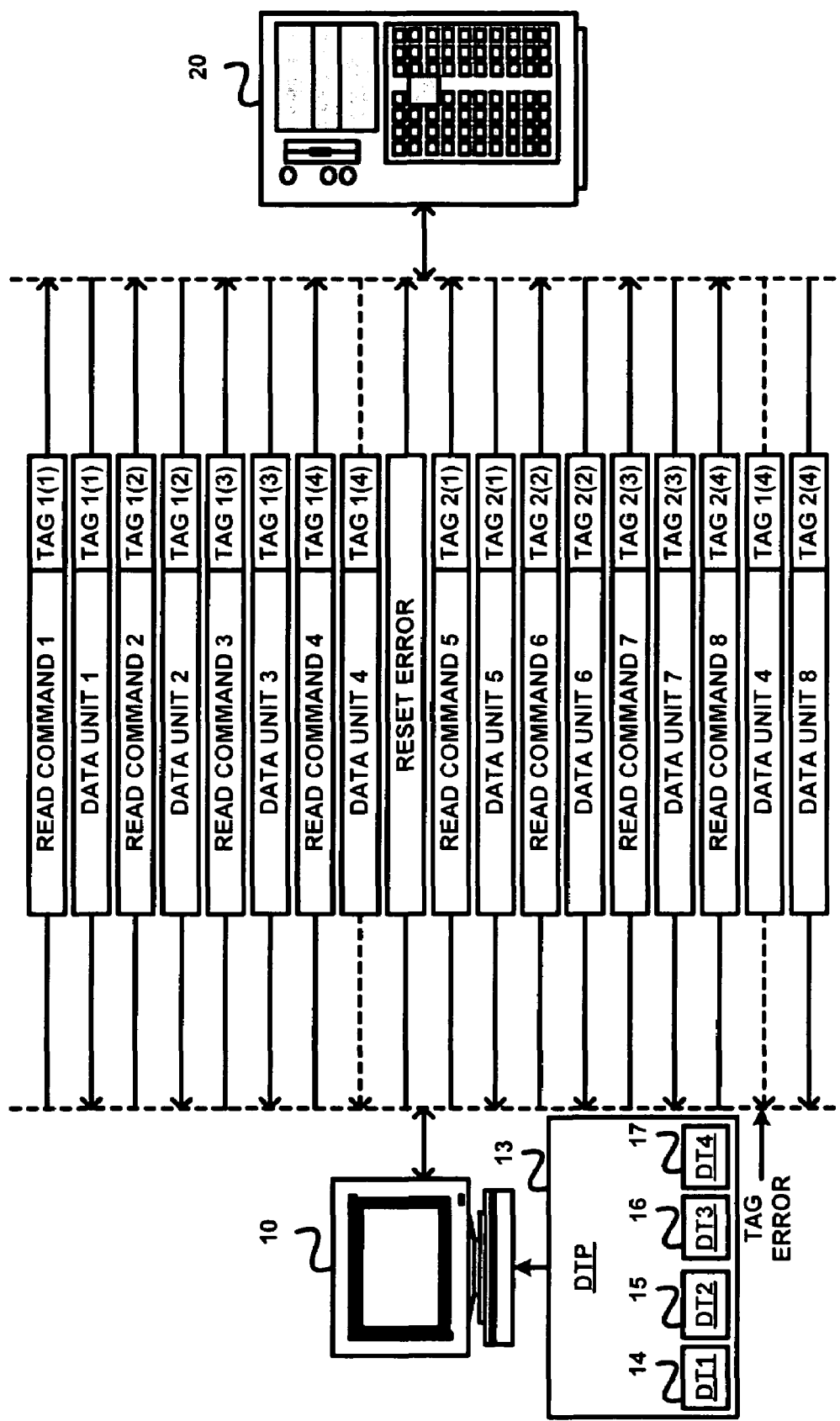
FIG. 4 illustrates exemplary data transfers between a data initiator device and a data target device in accordance with the flowchart illustrated in FIG. 3.

FIG. 3 illustrates a flowchart 40 representative of a practical implementation of flowchart 30. To facilitate an understanding of flowchart 40, the succeeding description herein of flowchart 40 will be provided in the context of workstation 10 operating as a data initiator device and server 20 operating as a data target device whereby, as illustrated in FIG. 4, workstation 10 issues read commands directed to transfers of data units responsive to the read commands from server 20 to workstation 10. Additionally, data tags are partitioned into four (4) data tag sets ("DT") 14–17 of eight (8) data tags each whereby parameter $N_{max}=4$. Data tag sets 14–17 are allocated to a data transfer protocol 13 whereby workstation 10 tactically designates one of the data tag sets 14–17 for tagging data transfers between workstation 10 and server 20 in accordance with flowchart 40.

During a stage S42 of flowchart 40, workstation 10 sets N=1. Workstation 10 thereafter proceeds to stages S44 and S46 of flowchart 40 whereby workstation 10 sequentially issues read commands 1–4 having attached data tags 1(1)–1(4), respectively, from data tag set ("DT1") 14 until an occurrence of a reset error associated with read command 4. As such, workstation 10 proceeds to stages S48–S52 of flowchart 40 to set N=2, and returns to stages S44 and S46 whereby workstation 10 sequentially issues read commands 5–8 having attached data tags 2(1)–2(4), respectively, from data tag set ("DT2") 15. Those having ordinary skill in the art will appreciate that a data transfer of data unit 4 from server 20 to workstation 10 due to an unsuccessful resetting of workstation 10 and server 20 to an equivalent state may occur before a data transfer of data unit 8 from server 20 to workstation 10 as indicated by the dashed arrows. However, unlike the prior art, a data error will not occur in view of the fact that workstation 10 will know that data unit 4 does not correspond to read command 8 because of the difference in data tags 1(4) and 2(4), respectively. The result therefore is a harmless tag error that can be ignored by workstation 10, which will receive responsive data unit 8 from server 20 in a timely manner or issue a reset error associated with a failure to receive responsive data unit 8 from server 20 in a timely manner.

Those having ordinary skill in the art will appreciate that workstation 10 will loop through stages S44–S52 unit such time N=5 during stage S52. At this time, workstation 10 returns to stage S42 to reset N=1 to thereby repeat stages S44–S50 as needed.

Furthermore, those of ordinary skill in the art will appreciate that, in practice, a structural implementation of flowcharts 30 and 40 will vary depending on the specific implementation of a device embodying the present invention. Thus, the variety of hardware platforms and software environments for structurally implementing flowcharts 30 and 40 is without limit.

Figure 5:
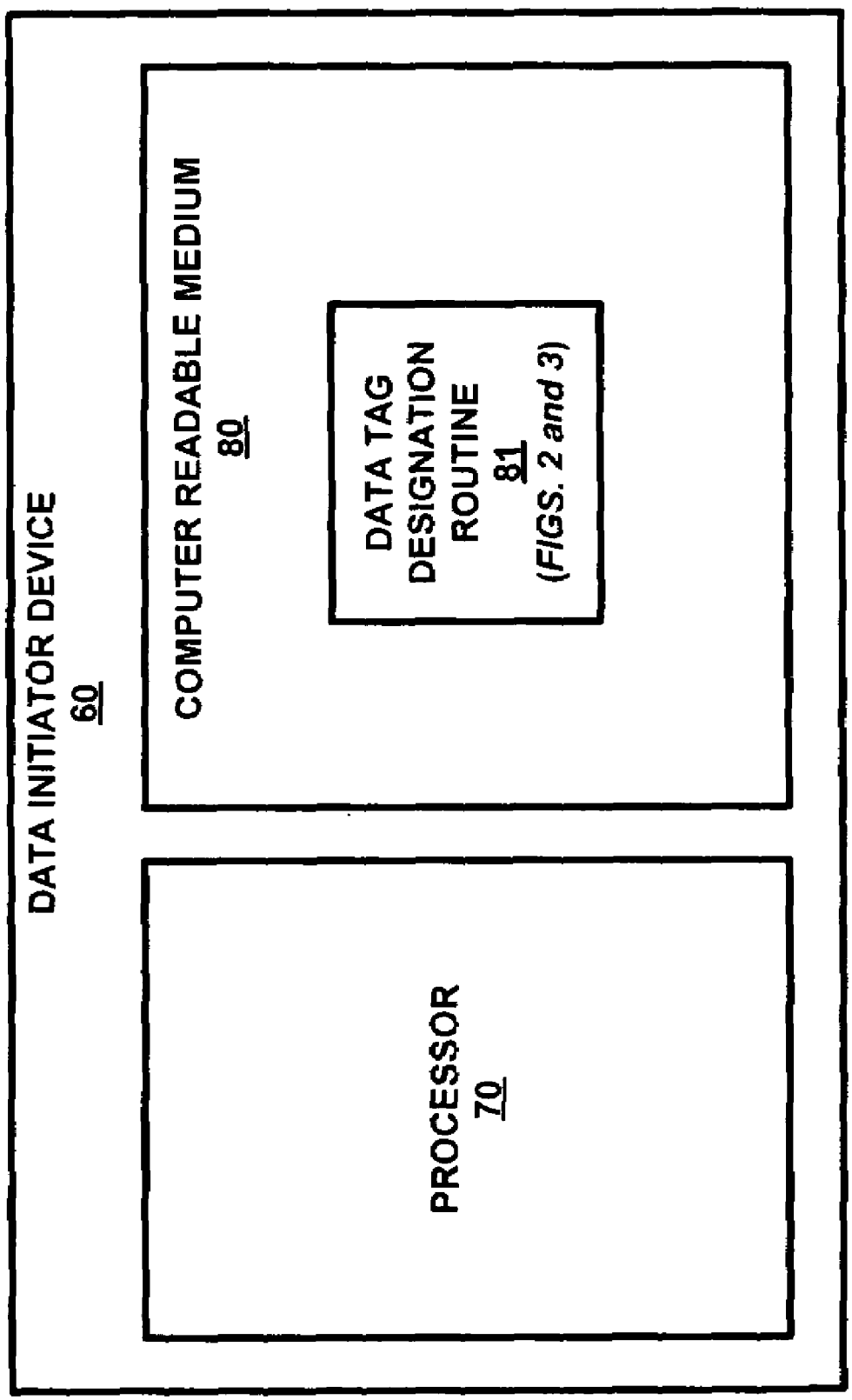
FIG. 5 illustrates one embodiment of a data initiator device in accordance with the present invention.

In one exemplary embodiment, a data initiator device 60 as illustrated in FIG. 5 employs a conventional processor 70 (e.g., a digital signal processor), and a conventional computer readable medium 80 (e.g., a ROM, hard drive, etc.) for storing computer instructions in a data tag designation routine 81 programmed, conventional or otherwise, in accordance with flowchart 30 (FIG. 2) or more particularly in accordance with flowchart 40 (FIG. 3). As such, processor 70 can be operated to execute a conventional operating system to control program execution of the computer instructions of routine 81 as needed.

Figure 6:
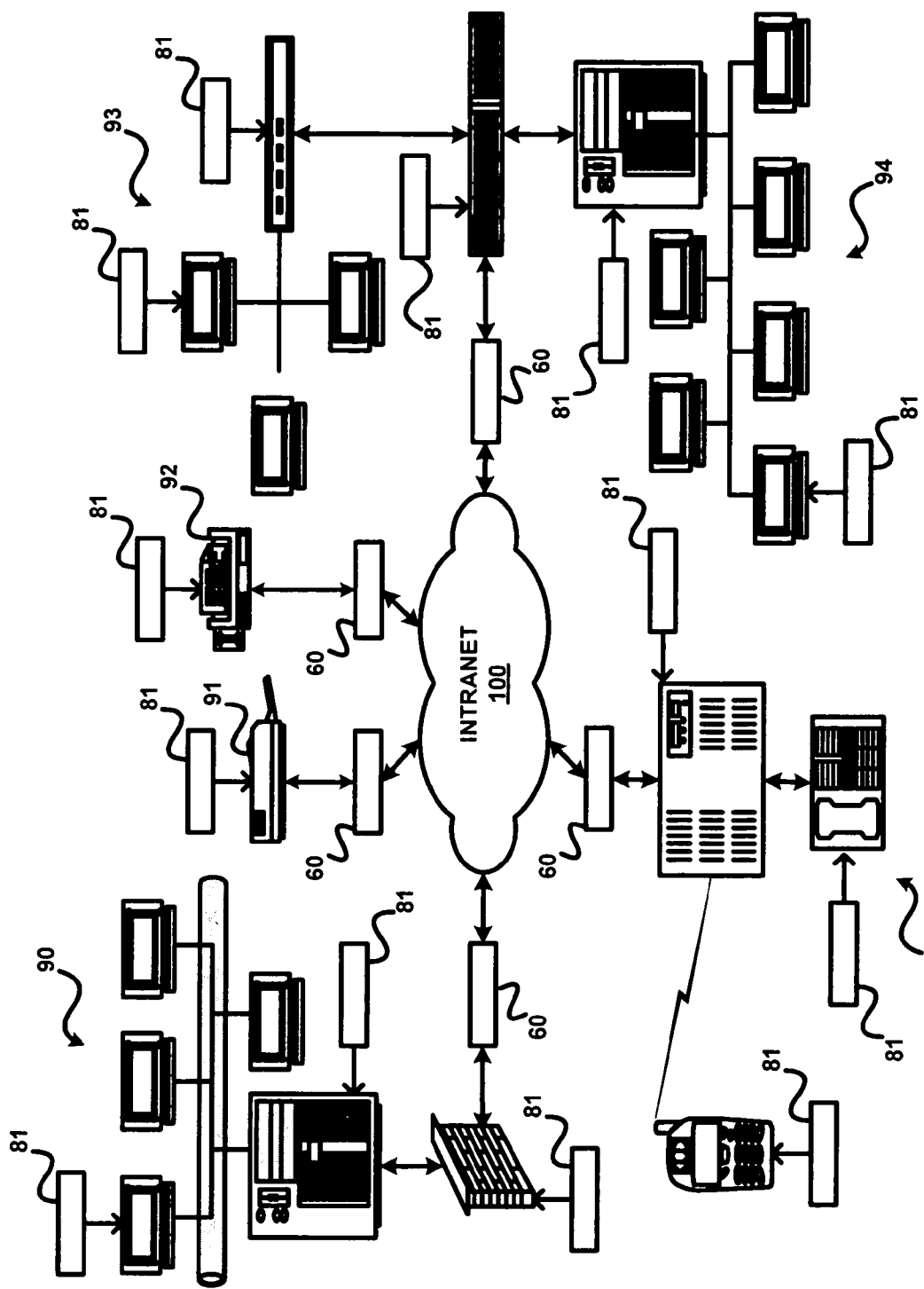
FIG. 6 illustrates an exemplary network incorporating the data initiator device illustrated in FIG. 5.

Those having ordinary skill in the art will also appreciate the various nodal incorporations of data initiator device 60 within a network environment. For example, as illustrated in FIG. 6, device 60 can be incorporated within various networks and devices connected to an intranet 100 as a whole unit or distributed unit.

Specifically, for a network 90, routine 81 can be incorporated within a firewall of network 90, a gateway server of network 90, and/or individual workstations of network 90 where the processors of these devices are used to execute routine 81. Alternatively, device 60 can be used to as a coupler, such as, for example, device 60 can be used to couple network 90 to intranet 100.

For a printer 91 and a fax 92, routine 81 can be incorporated in printer 91 and fax 92 where the processors of these devices are used to execute routine 81. Alternatively, device 60 can be used to couple printer 91 and fax 92 to intranet 100.

For networks 93 and 94, routine 81 can be incorporated within a router connecting network 93 to intranet 100, a repeater of network 93, individual workstations of network 93, a gateway server of network 94, and/or individual workstations of network 95 where the processors of these devices are used to execute routine 81. Alternatively, device 60 can be used to couple networks 93 and 94 to intranet 100.

For a network 95, routine 81 can be incorporated within a PSTN of network 95, a mobile phone of network 95, and/or a telephone of network 95 where the processors of these devices are used to execute routine 81. Alternatively, device 60 can be used to couple network 96 to intranet 100.

From the FIG. 6, those having ordinary skill in the art will appreciate the varied manner by which a routine 81 of the present invention may be utilized to provide efficient data transfers between devices.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A method for operating a data initiator device in communicating with a data target device based on a plurality of data tag sets, the method comprising:

designating a first set of at least one data tag for tagging data transfers between the data initiator device and the data target device;

attaching a first data tag from the first set of at least one data tag to a first data transfer command directed to a first data transfer between the data initiator device and the data target device subsequent to the designation of the first set of at least one data tag for tagging data transfers;

issuing the first data transfer command with the attached first data tag to the data target device;

designating a second set of at least one data tag for tagging data transfers in lieu of the first set of at least one data tag in response to a detection of a first error associated with an execution of the first data transfer command;

attaching a second data tag from a second set of at least one data tag to a second data transfer command directed to a second data transfer between the data initiator device and the data target device subsequent to the designation of the second set of at least one data tag for tagging data transfers; and issuing the second data transfer command with the attached second data tag to the data target device.

2. The method of claim 1, further comprising:

re-designating the first set of at least one data tag for tagging data transfers in lieu of the second set of at least one data tag in response to a detection of a second error associated with an execution of the second data transfer command;

attaching a third data tag from the first set of at least one data tag to a third data transfer command directed to a third data transfer between the data initiator device and the data target device subsequent to the re-designation of the first set of at least one data tag for tagging data transfers; and issuing the third data transfer command with the attached third data tag to the data target device.

3. The method of claim 1, further comprising:

designating a third set of at least one data tag for tagging data transfers in response to a detection of a second error associated with an execution of the second data transfer command;

attaching a third data tag from the third set of at least one data tag to a third data transfer command directed to a third data transfer between the data initiator device and the data target device subsequent to the designation of the third set of at least one data tag for tagging data transfers; and issuing the third data transfer command with the attached third data tag to the data target device.

4. The method of claim 3, further comprising:

re-designating the first set of at least one data tag for tagging data transfers in lieu of the third set of at least one data tag in response to a detection of a third error associated with an execution of the third data transfer command;

attaching a fourth data tag from the first set of at least one data tag to a fourth data transfer command directed to a fourth data transfer between the data initiator device and the data target device subsequent to the re-designation of the first set of at least one data tag for tagging data transfers; and issuing the fourth data transfer command with the attached fourth data tag to the data target device.

5. The method of claim 3, further comprising:

designating a fourth set of at least one data tag for tagging data transfers in lieu of the third set of at least one data tag in response to a detection of a third error associated with an execution of the third data transfer command;

attaching a fourth data tag form the fourth set of at least one data tag to a fourth data transfer command directed to a fourth data transfer between the data initiator device and the data target device subsequent to the designation of the fourth set of at least one data tag for tagging data transfers; and issuing the fourth data transfer command with the attached fourth data tag to the data target device.

6. The method of claim 5, further comprising:

re-designating the first set of at least one data tag for tagging data transfers in lieu of the fourth set of at least one data tag in response to a detection of a fourth error associated with an execution of the fourth data transfer command;

attaching a fifth data tag from the first set of at least one data tag to a fifth data transfer command directed to a fifth data transfer between the data initiator device and the data target device subsequent to the re-designation of the first set of at least one data tag for tagging data transfers; and issuing the fifth data transfer command with the attached fifth data tag to the data target device.

7. A computer readable medium tangibly embodying a program of machine-readable instructions executable by a processor to perform operations to operate a data initiator device in communicating with a data target device based on a plurality of data tag sets, the operations comprising:

designating a first set of at least one data tag for tagging data transfers for transferring data between the data initiator device and the data target device;

attaching a first data tag from the first set of at least one data tag to a first data transfer command directed to a first data transfer between the data initiator device and the data target device subsequent to the designation of the first set of at least one data tag for tagging data transfers;

issuing the first data transfer command with the attached first data tag to the data target device;

designating a second set of at least one data tag for tagging data transfers in lieu of the first set of at least one data tag in response to a detection of a first error associated with an execution of the first data transfer command;

attaching a second data tag from a second set of at least one data tag to a second data transfer command directed to a second data transfer between the data initiator device and the data target device subsequent to the designation of the second set of at least one data tag for tagging data transfers; and issuing the second data transfer command with the attached second data tag to the data target device.

8. The computer readable medium of claim 7, wherein the operations further include:

re-designating the first set of at least one data tag for tagging data transfers in lieu of the second set of at least one data tag in response to a detection of a second error associated with an execution of the second data transfer command;

attaching a third data tag from the first set of at least one data tag to a third data transfer command directed to a third data transfer between the data initiator device and the data target device subsequent to the re-designation of the first set of at least one data tag for tagging data transfers; and issuing the third data transfer command with the attached third data tag to the data target device.

9. The computer readable medium of claim 7, wherein the operations further include:

designating a third set of at least one data tag for tagging data transfers in lieu of the second set of at least one data tag in response to a detection of a second error associated with an execution of the second data transfer;

attaching a third data tag from the third set of at least one data tag to a third data transfer command directed to a third data transfer between the data initiator device and the data target device subsequent to the designation of the third set of at least one data tag for tagging data transfers; and issuing the third data transfer command with the attached third data tag to the data target device.

10. The computer readable medium of claim 9, wherein the operations further include:

re-designating the first set of at least one data tag for tagging data transfers in lieu of the third set of at least one data tag in response to a detection of a third error associated with an execution of the third data transfer command;

attaching a fourth data tag from the first set of at least one data tag to a fourth data transfer command directed to a fourth data transfer between the data initiator device and the data target device subsequent to the re-designation of the first set of at least one data tag for tagging data transfers; and issuing the fourth data transfer command with the attached fourth data tag to the data target device.

11. The computer readable medium of claim 9, wherein the operations further include:

designating a fourth set of at least one data tag for tagging data transfers in lieu of the third set of at least one data tag in response to a detection of a third error associated with an execution of the third data transfer command;

attaching a fourth data tag form the fourth set of at least one data tag to a fourth data transfer command directed to a fourth data transfer between the data initiator device and the data target device subsequent to the designation of the fourth set of at least one data tag for tagging data transfers; and issuing the fourth data transfer command with the attached fourth data tag to the data target device.

12. The computer readable medium of claim 11, wherein the operations further include:

re-designating the first set of at least one data tag for tagging data transfers in lieu of the fourth set of at least one data tag in response to a detection of a fourth error associated with an execution of the fourth data transfer command;

attaching a fifth data tag from the first set of at least one data tag to a fifth data transfer command directed to a fifth data transfer between the data initiator device and the data target device subsequent to the re-designation of the first set of at least one data tag for tagging data transfers; and issuing the fifth data transfer command with the attached fifth data tag to the data target device.

13. The computer readable medium of claim 7, further comprising:

means for allocating the plurality of data tag sets to a data transfer protocol for conducting data transfers between the data initiator device and the data target device.

14. A data initiator device, comprising:

a processor; and a memory storing instructions operable with the processor for operate a data initiator device in communicating with a data target device based on a plurality of data tag sets, the instructions being executed for:

designating a first set of at least one data tag for tagging data transfers for transferring data between the data initiator device and the data target device;

attaching a first data tag from the first set of at least one data tag to a first data transfer command directed to a first data transfer between the data initiator device and the data target device subsequent to the designation of the first set of at least one data tag for tagging data transfers;

issuing the first data transfer command with the attached first data tag to the data target device;

designating a second set of at least one data tag for tagging data transfers in lieu of the first set of at least one data tag in response to a detection of a first error associated with an execution of the first data transfer command;

attaching a second data tag from a second set of at least one data tag to a second data transfer command directed to a second data transfer between the data initiator device and the data target device subsequent to the designation of the second set of at least one data tag for tagging data transfers; and issuing the second data transfer command with the attached second data tag to the data target device.

15. The data initiator device of claim 14, wherein the instructions further include:

re-designating the first set of at least one data tag for tagging data transfers in lieu of the second set of at least one data tag in response to a detection of a second error associated with an execution of the second data transfer command;

attaching a third data tag from the first set of at least one data tag to a third data transfer command directed to a third data transfer between the data initiator device and the data target device subsequent to the re-designation of the first set of at least one data tag for tagging data transfers; and issuing the third data transfer command with the attached third data tag to the data target device.

16. The data initiator device of claim 14, wherein the instructions further include:

designating a third set of at least one data tag for tagging data transfers in lieu of the second set of at least one data tag in response to a detection of a second error associated with an execution of the second data transfer command;

attaching a third data tag from the third set of at least one data tag to a third data transfer command directed to a third data transfer between the data initiator device and the data target device subsequent to the designation of the third set of at least one data tag for tagging data transfers; and issuing the third data transfer command with the attached third data tag to the data target device.

17. The data initiator device of claim 16, wherein the instructions further include:
- re-designating the first set of at least one data tag for tagging data transfers in lieu of the third set of at least one data tag in response to a detection of a third error associated with an execution of the third data transfer command;
- attaching a fourth data tag from the first set of at least one data tag to a fourth data transfer command directed to a fourth data transfer between the data initiator device and the data target device subsequent to the re-designation of the first set of at least one data tag for tagging data transfers; and
- issuing the fourth data transfer command with the attached fourth data tag to the data target device.

18. The data initiator device of claim 16, wherein the instructions further include:
- designating a fourth set of at least one data tag for tagging data transfers in lieu of the third set of at least one data tag in response to a detection of a third error associated with an execution of the third data transfer command;
- attaching a fourth data tag form the fourth set of at least one data tag to a fourth data transfer command directed to a fourth data transfer between the data initiator device and the data target device subsequent to the designation of the fourth set of at least one data tag for tagging data transfers; and
- issuing the fourth data transfer command with the attached fourth data tag to the data target device.

19. The data initiator device of claim 18, wherein the instructions further include:
- re-designating the first set of at least one data tag for tagging data transfers in lieu of the fourth set of at least one data tag in response to a detection of a fourth error associated with an execution of the fourth data transfer command;
- attaching a fifth data tag from the first set of at least one data tag to a fifth data transfer command directed to a fifth data transfer between the data initiator device and the data target device subsequent to the re-designation of the first set of at least one data tag for tagging data transfers; and
- issuing the fifth data transfer command with the attached fifth data tag to the data target device.

20. The data initiator device of claim 14, further comprising:
- means for allocating the plurality of data tag sets to a data transfer protocol for conducting data transfers between the data initiator device and the data target device.

* * * * *